(12) United States Patent
Burmeister et al.

(10) Patent No.: US 6,967,930 B2
(45) Date of Patent: Nov. 22, 2005

(54) METHOD AND APPARATUS FOR TRANSMITTING DATA PACKETS

(75) Inventors: Carsten Burmeister, Langen (DE); Rolf Hakenberg, Langen (DE)

(73) Assignee: Matsushita Electric Industrial Co., Ltd., Osaka (JP)

( * ) Notice: Subject to any disclaimer, the term of this patent is extended or adjusted under 35 U.S.C. 154(b) by 900 days.

(21) Appl. No.: 09/910,802

(22) Filed: Jul. 24, 2001

(65) Prior Publication Data

US 2002/0027882 A1  Mar. 7, 2002

(30) Foreign Application Priority Data

Sep. 7, 2000 (EP) .................................. 00119571

(51) Int. Cl.⁷ .......................... G01R 31/08; H04J 1/16; H04L 1/00; H04L 12/26
(52) U.S. Cl. .................. 370/253; 370/241.1; 370/348; 370/465; 370/471; 370/474; 370/389; 710/52; 710/53; 710/54; 710/60; 710/68; 714/704; 714/776; 714/779
(58) Field of Search .................... 370/241.1, 253, 370/348, 465, 471, 474, 475, 476, 477, 389, 370/392, 393, 394, 395.1; 710/52, 53, 54, 710/56, 60, 68; 714/704, 776, 779

(56) References Cited

U.S. PATENT DOCUMENTS 6,300,887 B1 * 10/2001 Le .............................. 341/60
6,608,841 B1 * 8/2003 Koodli ...................... 370/474

FOREIGN PATENT DOCUMENTS

| EP | WO0051307 | * | 8/2000 |
| WO | 00/51307 | | 8/2000 |
| WO | 00/51308 | | 8/2000 |

OTHER PUBLICATIONS

M. Degermark et al., "Low-Loss TCP/IP Header Compression for Wireless Networks", vol. 3, No. 5, Oct. 1, 1997, pp. 375-387, XP000728935. ISSN: 1022-0038.
S. Casner et al., "compressing IP/UDP/RTP Headers for Low-Speed Serial Links", IETF Internet Draft, Jul. 27, 1998, XP002125101.

* cited by examiner

Primary Examiner—Wellington Chin
Assistant Examiner—Raj Jain
(74) Attorney, Agent, or Firm—Wenderoth, Lind & Ponack, L.L.P.

(57) ABSTRACT

The invention relates to a method and apparatus for transmitting data packets over a channel wherein the data packets have compressed headers. After compressing a header using a context, a number of consecutive update packets are transmitted, each containing data indicating the context. According to the invention, the channel quality is determined and the number of update packets is set accordingly. The channel quality may be determined by measuring the block error rate or the signal-to-noise ratio. Alternatively, the channel quality may be estimated by evaluating whether a NACK message has been received. The total number of update and non-update packets transmitted during a context update phase may be set according to the Round Trip Time. The number of non-update packets may further be determined based on codec properties. The invention may advantageously be used over unreliable, e.g. wireless, channels.

8 Claims, 8 Drawing Sheets

METHOD AND APPARATUS FOR TRANSMITTING DATA PACKETS

BACKGROUND OF THE INVENTION

1. Field of the Invention

The invention generally relates to a method and apparatus for transmitting data packets over an unreliable channel, and in particular to transmitting data packets having compressed headers.

2. Description of the Related Art

Several communication technologies exist for transmitting data from one terminal to another terminal. The most commonly used techniques are cellular telephony and the Internet. Further developments are media-on-demand and conversational services such as Internet telephony. Most of these services require the transport of real-time data including audio and video contents.

The Real-time Transport Protocol (RTP) provides means for such purposes. RTP is an Internet protocol for transmitting data real-time or nearly real-time. RTP itself does not guarantee real-time delivery of data but it does provide mechanisms for the sending and receiving applications to support streaming data. Typically, RTP runs on top of the UDP protocol. UDP (User Datagram Protocol) is a connectionless protocol that, like TCP, runs on top of IP networks. Unlike TCP/IP, UDP/IP provides no error recovery services, but instead offers a direct way to send and receive datagrams over IP network.

While RTP has been developed for fixed networks, it may nevertheless be used in mobile networks. However, one problem in using RTP over mobile networks is the limited bandwidth in the mobile channel. This is because each of the protocols RTP, UDP and IP has its own header. A packet will then, in addition to link layer framing, have an IP header of 20 bytes, a UDP header of 8 bytes, and an RTP header of 12 bytes, thus summing up to at least 40 bytes.

This header is highly redundant, and to decrease the amount of overhead, header compression mechanisms have been developed. Header compression protocols remove the redundancy of the header and encode the information in an efficient way. This may lead to a compression of the original header down to one byte in the best case.

Figure 1:
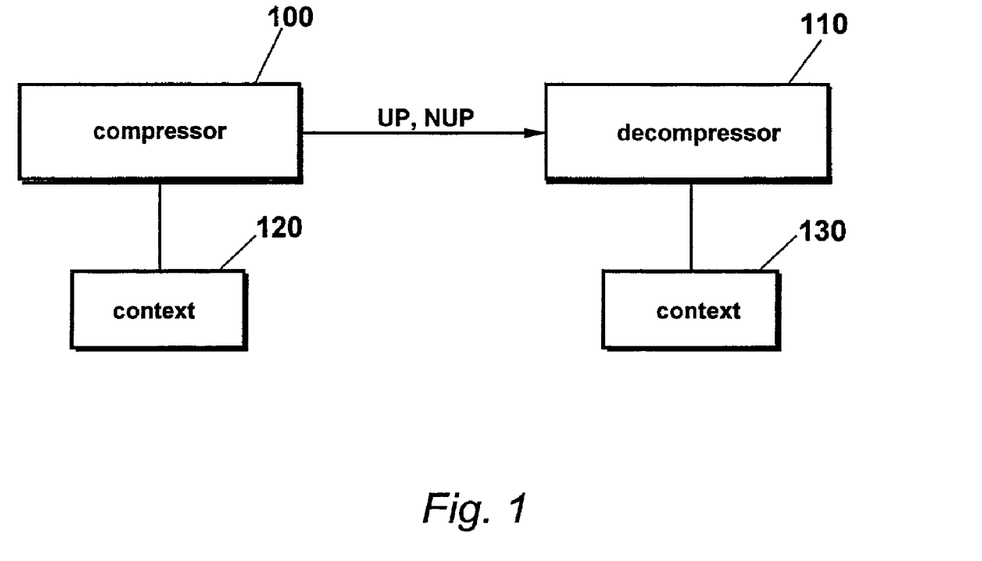
FIG. 1 illustrates a compressor/decompressor system, in which UP and NUP packets are used.

A system using a header compression protocol is illustrated in FIG. 1. The transmitter comprises a compressor 100 which is used for compressing the original header. The compressed header is then transmitted to the receiver and is there decompressed by the decompressor 110.

The context 120 is the state which the compressor uses to compress the header. The context is a set of variables and consists basically of an uncompressed version of the header fields of the last header. Besides the actual header fields, the context comprises additional variables, such as first order differences of header fields that have been detected to be constant for a series of successive packets. The context can also contain additional information describing the packet stream, for example the typical inter-packet increase in sequence numbers or timestamps.

In operation, the compressor 100 and the decompressor 110 are required to maintain a common context. When the context 130 of the decompressor 110 is not consistent with the context 120 of the compressor 100, header decompression will fail. This situation can occur when data packets are transmitted over unreliable, e.g. wireless, channels because packets may then be lost or damaged between compressor 100 and decompressor 110.

It is therefore necessary to initiate a resynchronization procedure once the context 130 of the decompressor 110 has become invalid. For this purpose, update (UP) packets are provided for transmitting information contained in the context 120 of the compressor 100, to the decompressor 110. Thus, by using UP packets, the context 130 is updated.

The performance of a header compression scheme can be described with two parameters, compression efficiency and robustness. A robust scheme tolerates errors on the link over which header compression takes place without losing additional packets, introducing additional errors or using more bandwidth. Using UP packets increases on the one hand the robustness, but decreases compression efficiency, since UP packets are large in size. Therefore, in addition to UP packet, non-update (NUP) packets are used which are very small and which only depend on the previous UP packet. Thus, NUP packets do not update the context so that, if a NUP packet gets lost, the context 130 of the decompressor 110 continues to be valid, so that the receiver is still able to decompress the following packets.

The packet stream to be compressed usually behaves very regularly. Most of the header fields are constant and do not change during the life-time of the stream. Some fields do change with each packet (e.g. sequence number and timestamp). If the values of these fields are synchronized to the sequence number and thus can be calculated from this number the stream is regular. Irregularities in these fields disturb this synchronization, e.g. because of a non-linear jump in the RTP-timestamp field. With an irregularity it is not possible to calculate the values of the changed fields from the sequence number. These irregularities might occur quite frequently, e.g. on the average every second for a conversational audio stream.

The length of NUP packets increases with time due to two reasons. If the stream shows irregularities the NUP packets that would be sent are larger, because these irregularities have to be included. If no irregularities in the stream occur, the length of the NUP packets also might increase with time, because of larger differences to the last update packets. To reduce the length of the NUP packets an update has to be performed, i.e. a number of UP packets are sent and if correctly received the context is updated.

One difficulty is to determine the number of UP packets to be sent for an update. If too many are sent, the context would already be updated and valid, while UP packets are still sent. This unnecessarily increases the transmitted bits and decreases the efficiency, because the UP packets are larger than NUP packets. On the other hand if not enough UP packets are sent the risk of losing the context is increased, because the probability increases that none of the sent UP packets is received.

Consequently, when the number of UP packets is too high, compression efficiency is reduced. If the number of UP packets is too low, the decompressor might lose its context so that all packets have to be discarded until the next UP packet is received correctly.

In unreliable channels, such as wireless networks, the channel quality usually varies considerably. This will now be illustrated in more detail with reference to FIGS. 2a to 2c.

Figure 2A:
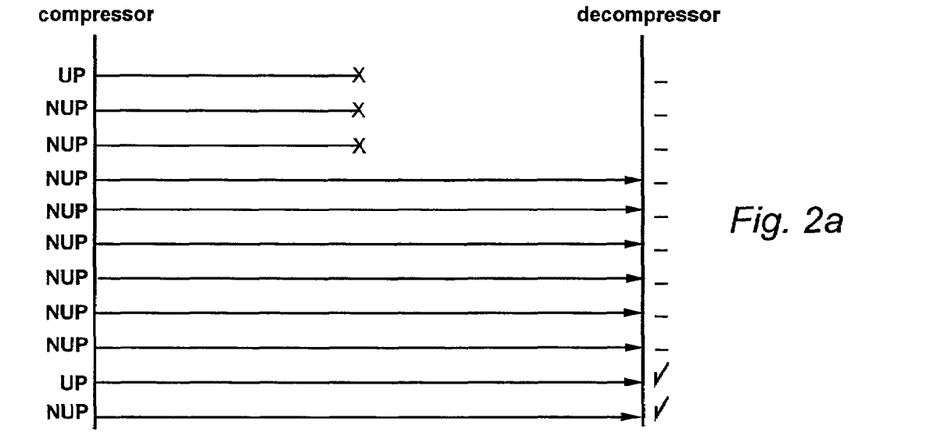
FIGS. 2a–2c illustrate time charts of UP-NUP sequences in case of a burst error.
Figure 2B:
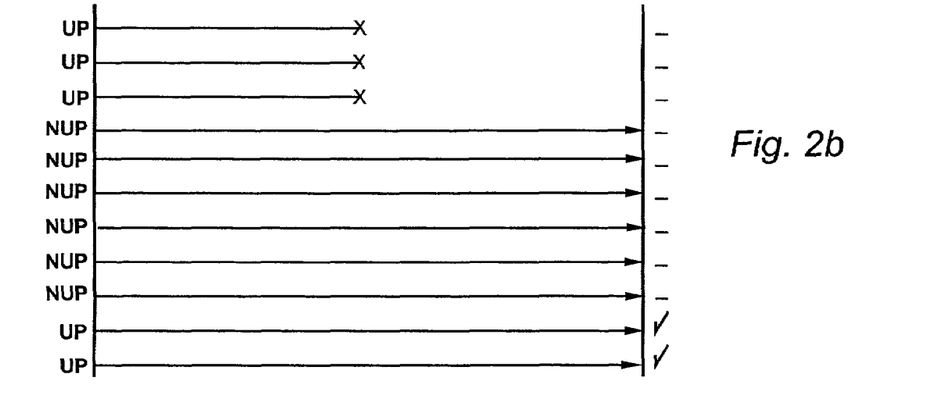
Figure 2C:
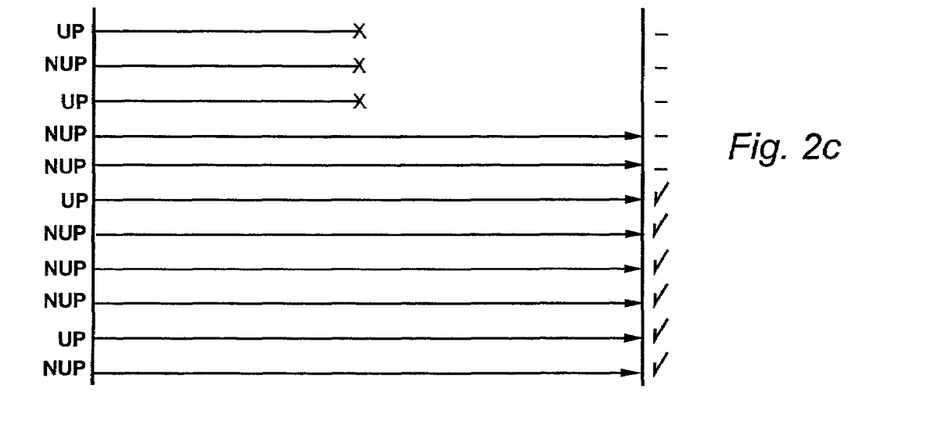

In these examples, it is assumed that a burst error occurs. Burst errors are those errors by which several successive packets get lost. In the examples of FIGS. 2a to 2c, three packets are assumed to get lost. Referring to FIG. 2a, one UP packet and two NUP packets cannot be received by the decompressor. Since the decompressor now has an invalid context, the following NUP packets have to be discarded so that there is a total loss of nine packets at the receiver.

In FIG. 2b, the number of consecutive UP packets has been increased to the amount of three. While sending a number of consecutive UP packets is usually more reliable because the probability that at least one of these UP packets is received correctly is quite high, the compression efficiency is decreased. Moreover, in the example of FIG. 2b, the robustness has in fact not been improved, since due to the nature of the burst error, again nine packets cannot be decompressed at the receiver.

One approach to overcome the problems of burst errors is to use a sparse mode, as illustrated in FIG. 2c. Using a sparse mode means that in a fixed order, UP and NUP packets are sent, so that sending all UP packets in a row is avoided. In the example of FIG. 2c, this sequence is UP-NUP-UP-NUP-NUP-UP-NUP-NUP-NUP-UP-NUP- . . . As can be seen from FIG. 2c, even transmitting packets in the sparse mode might lead to a significant loss of data packets.

Thus, the prior art techniques cannot properly deal with both compression efficiency and robustness. Instead, it has been found that it is a severe problem to determine the optimum conditions.

SUMMARY OF THE INVENTION

The present invention has been made in consideration of the above situation, and has as its primary object to provide a method and apparatus for transmitting data packets over an unreliable channel, capable of improving both the efficiency and robustness.

It is another object of the present invention to allow for dynamically adapting the transmission and compression mechanism to the current channel quality. In particular, an object of the invention is to allow for dynamically controlling the update of the decompressor's context according to the channel quality.

It is still another object of the present invention to allow for sending UP packets only as many times as needed to ensure on the one hand, a high robustness and on the other hand, a better compression efficiency.

A further object of the present invention is to reduce the mean header size even when channel quality varies.

These and other objects of the present invention will become apparent hereinafter.

To achieve these objects, according to a first aspect of the present invention, there is provided a method of transmitting data packets over a channel, where the data packets have compressed headers. The method comprises the steps of compressing a header using a context; and transmitting a number of consecutive update packets, each containing data indicating said context. The method further comprises the steps of determining the channel quality; and setting said number of update packets dependent on the determined channel quality.

According to a second aspect, the invention provides an apparatus for transmitting data packets over a channel, where the data packets have compressed headers. The apparatus comprises a compressor for compressing a header using a context; transmission means for transmitting a number of consecutive update packets, each containing data indicating said context; means for determining the channel quality; and control means for setting said number of update packets dependent on the determined channel quality.

BRIEF DESCRIPTION OF THE DRAWINGS

The accompanying drawings are incorporated into and form a part of the specification to illustrate several embodiments of the present invention. These drawings together with the description serve to explain the principles of the invention. The drawings are only for the purpose of illustrating preferred and alternative examples of how the invention can be made and used and are not to be construed as limiting the invention to only the illustrated and described embodiments. Further features and advantages will become apparent from the following and more particular description of the various embodiments of the invention, as illustrated in the accompanying drawings, wherein.

DETAILED DESCRIPTION OF THE INVENTION

The illustrative embodiments of the present invention will be described with reference to the figure drawings wherein like elements and structures are indicated by like reference numbers. Preferred embodiments of the invention will be described in more detail hereinafter.

Figure 3:
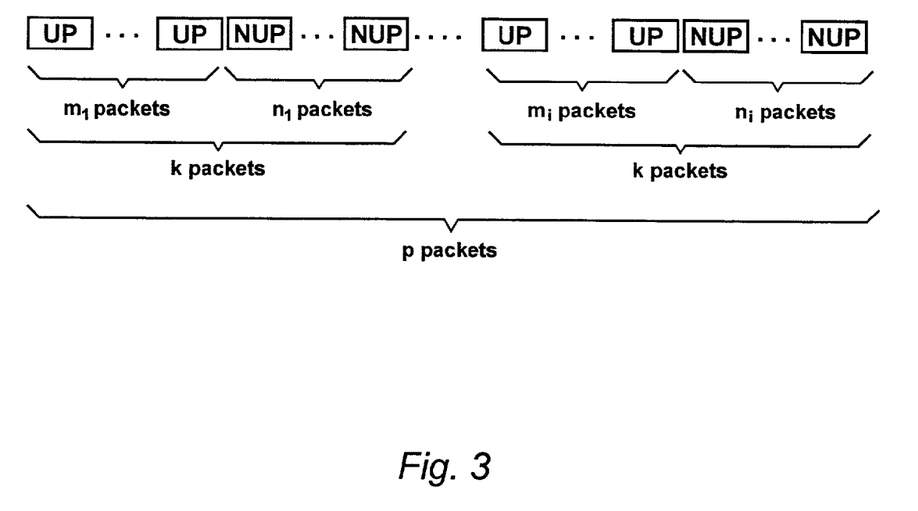
FIG. 3 illustrates the UP-NUP sequence during a context update phase according to the invention.

Referring now to FIG. 3, the sequence of UP and NUP packets during the context update phase can be divided into a number of subsequences. Each subsequence contains a number of UP packets followed by a number of NUP packets. The following parameters are used for describing the UP-NUP sequence according to the invention.

The parameter p describes the total number of packets in the context update phase. This phase is entered whenever updating the context is considered necessary or at least useful, e.g. in case of context loss or, more generally, whenever an irregularity in the data stream has been detected. The duration of the context update phase is chosen large enough to enable the decompressor to update its context.

The parameter k is the number of packets in each subsequence. In the preferred embodiment in FIG. 3, this parameter is the same in each subsequence.

The parameter $m_i$ describes the number of UP packets in the i-th subsequence. The value of this parameter may differ from subsequence to subsequence, and in a preferred embodiment of the invention, the parameter is decremented by one from subsequence to subsequence, i.e. $m_i=m_{i-1}-1$.

Finally, the parameter $n_i$ describes the number of NUP packets in the i-th subsequence.

Figure 4A:
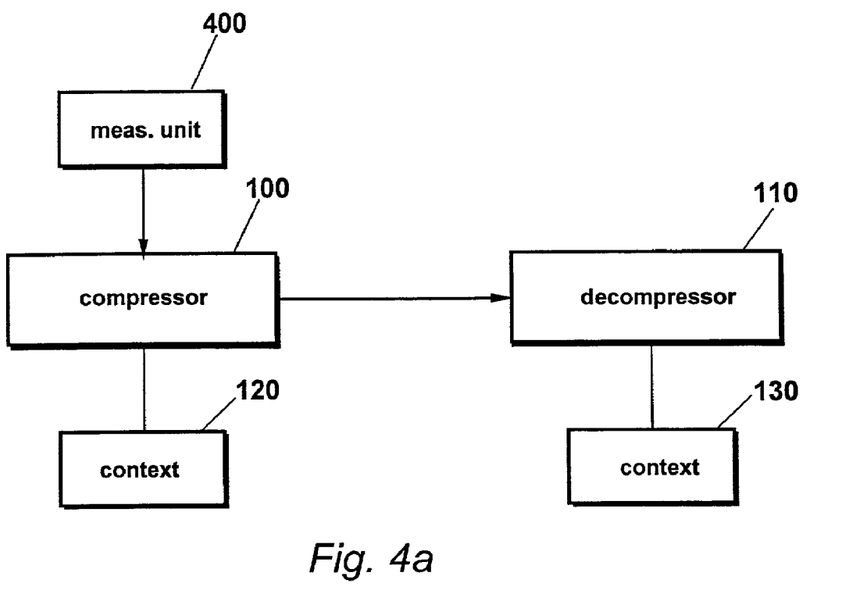
FIGS. 4a and 4b illustrate compressor/decompressor systems in which the invention may preferably be used.
Figure 4B:
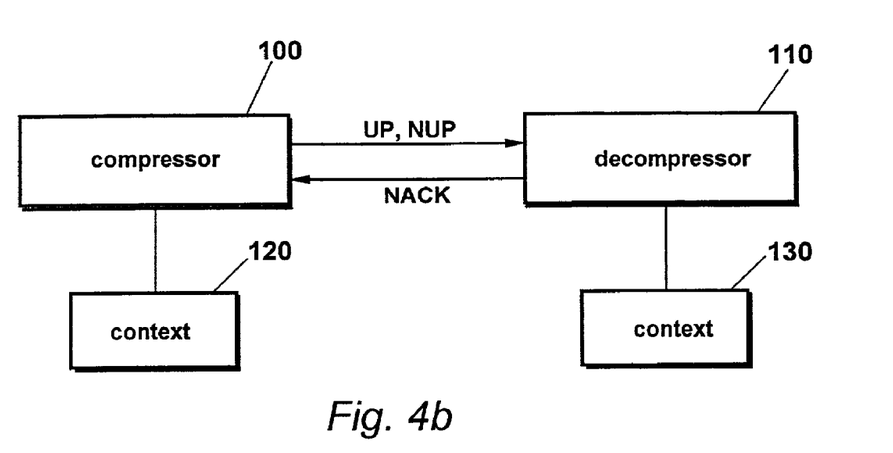

FIGS. 4a and 4b illustrate compressor/decompressor systems in which the invention may preferably be applied. According to FIG. 4a, the compressor receives measurement values concerning the channel quality from the measurement unit 400. The measurement unit 400 may be any entity, e.g. a physical layer entity, which can provide the compressor 100 with measurement values indicating the channel quality. Such values may include any kind of measures indicating, for example, noise properties in the channel or any bit or block errors. If actual measurements are not available, the measurement unit 400 might be a controller unit of the transmitter capable of performing any actions leading to at least estimated quality values.

In the system of FIG. 4b the decompressor is capable of sending non-acknowledgement (NACK) messages to the compressor in case each of the UP packets of one subsequence are lost. The involvement of NACKs will become more apparent from the discussion below.

Figure 5:
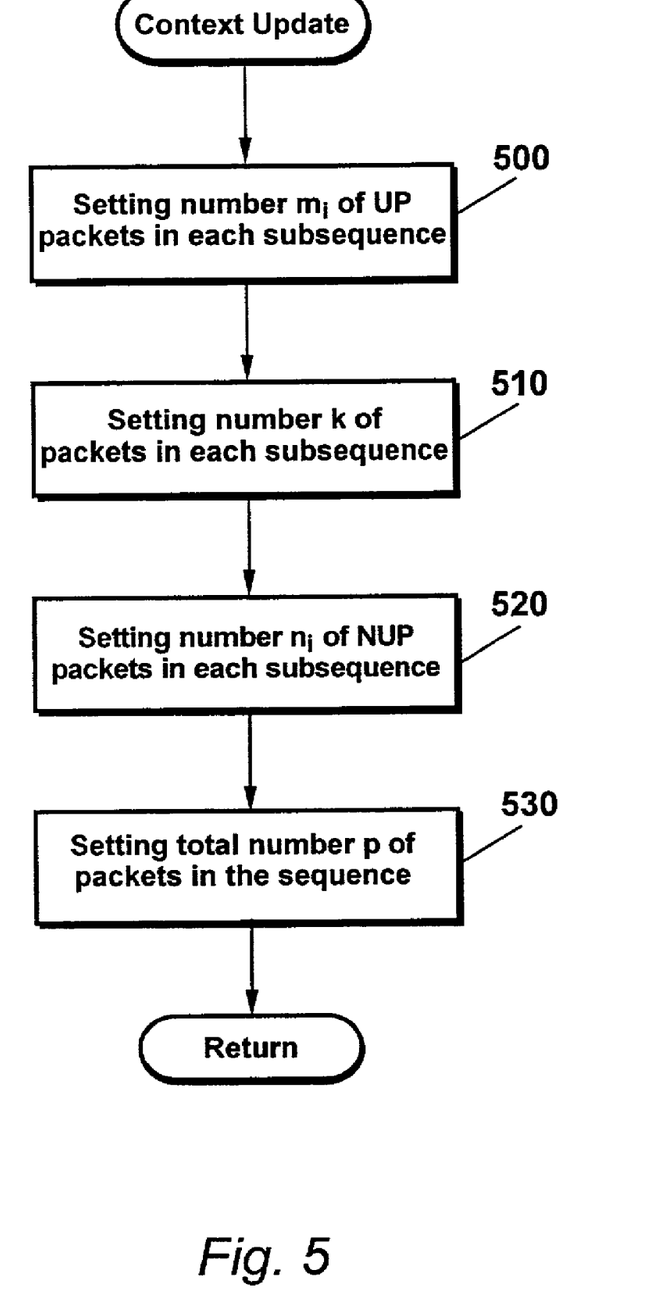
FIG. 5 shows a general flow chart of the context update process according to the invention.

Turning now to FIG. 5 which illustrates the overall flow chart of updating the context 130, the process includes the steps 500 to 530 of setting each of the parameter $m_i$, k, $n_i$, and p. As will be appreciated by those of ordinary skill in the art, the sequence of the steps illustrated in FIG. 5 may change. For instance, parameters p or k may be set first. Further, it is within the scope of the invention that the process of updating the context may include setting only some of the parameters while the remaining parameters are chosen to be constant or are set to default values.

Setting parameters according to the invention will now be described in more detail. In step 500, the number $m_i$ of UP packets in each subsequence is set. As mentioned above, this number is preferably decreased by one from subsequence to subsequence. This scheme is chosen to take into account that the probability that at least one UP packet is correctly received, increases with the value of i. It is then in fact only necessary to find an optimum start value $m_1$.

Figure 6A:
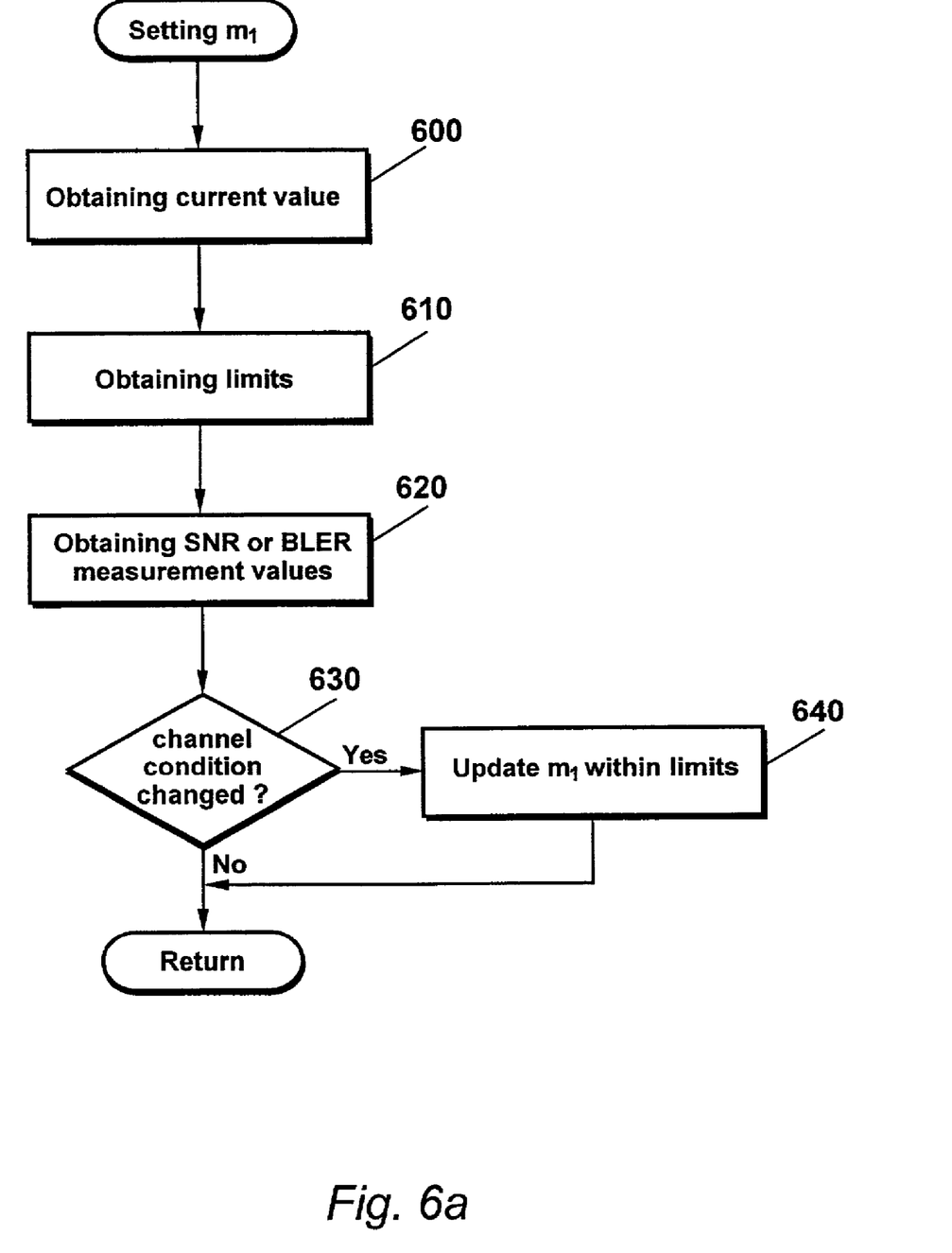
FIGS. 6a and 6b are flow charts illustrating preferred embodiments of the process of setting the number of UP packets in each subsequence.

A preferred embodiment of setting $m_1$ is illustrated in FIG. 6a. In step 600, the compressor 100 obtains the current value of parameter $m_1$. Then, in step 610, a maximum and a minimum value for $m_1$ is read. The minimum and maximum values might for instance be set to two and six, respectively.

If at session set-up, the compressor cannot obtain a current value of the parameter $m_1$ in step 600, the compressor uses a start-up value instead. The start-up value may preferably be set to the mean value of the minimum and maximum limits.

Once the current value and the limits are obtained, the compressor receives measurement values from measurement unit 400 which had been discussed above in the context of FIG. 4a. The values obtained in step 620 are preferably measurement values of the signal-to-noise ratio SNR or the block error rate BLER in the channel. If the SNR value is low, i.e. the BLER is high, a higher value of $m_1$ is required to increase the probability of correctly receiving the data packets at the decompressor.

It is then determined in step 630, using the obtained measurement value, whether the channel condition has changed. If so, the parameter $m_1$ is updated in step 640. Since the channel conditions might change very quickly and frequently, the value $m_1$ is adapted gradually, i.e. it is increased or decreased by a fixed amount depending on whether the channel quality has grown better or worse.

Figure 6B:
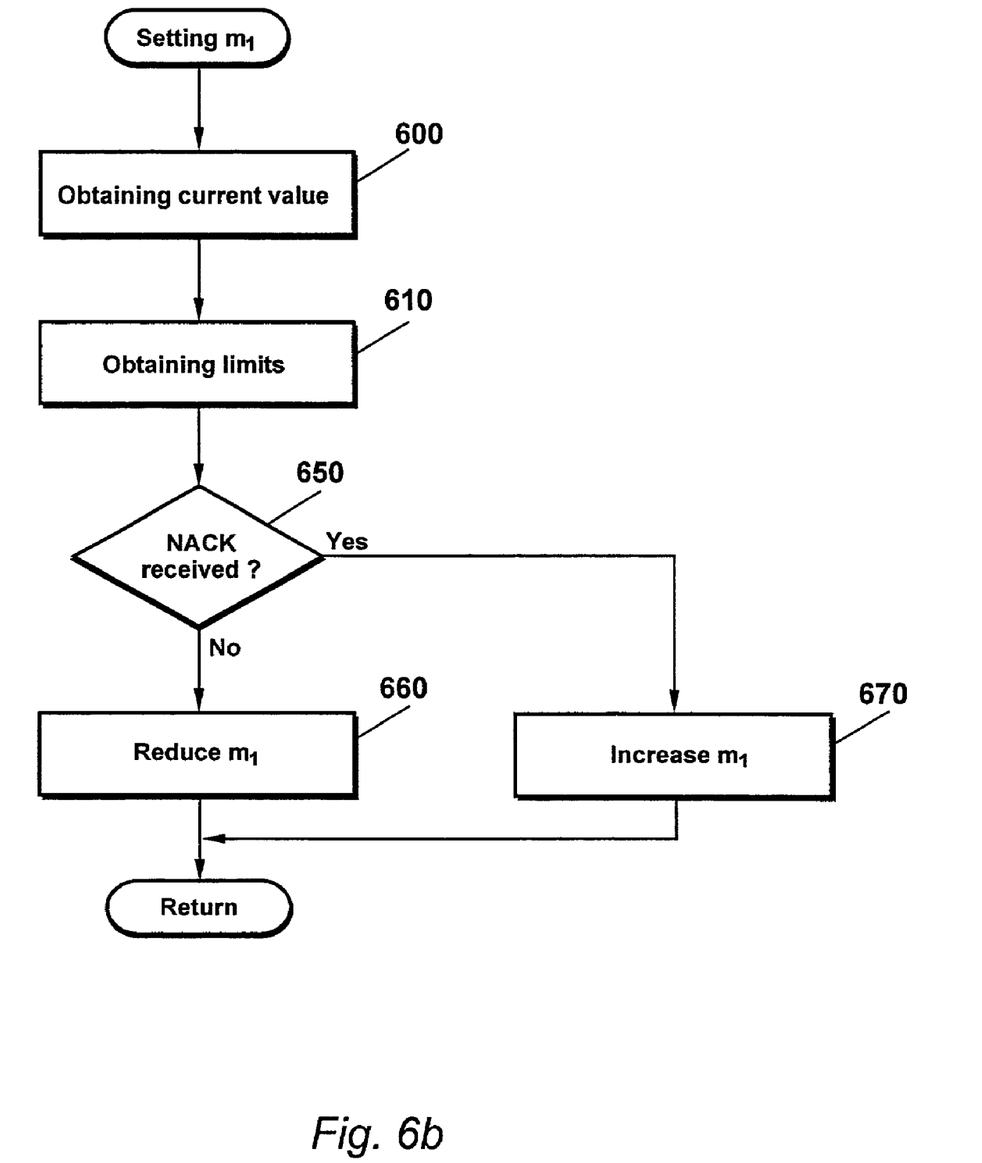

Another preferred embodiment of setting the number $m_1$ of UP packets in the first subsequence is shown in FIG. 6b. This approach is preferably used when there are no measurement values available from measurement unit 400. After obtaining the current value and the minimum and maximum limits, the compressor determines in step 650 whether a NACK is received. If at least one UP packet of the first subsequence is received correctly, the decompressor 110 does not send a NACK message. Thus, if the compressor 100 does not receive a NACK within the complete procedure, the parameter $m_1$ is reduced by one for the next update procedure (step 660). If however a NACK is received, the parameter $m_1$ is increased in step 670. This can preferably be done either by adding a predetermined value or by multiplying the current value by a predetermined factor.

While in the embodiments discussed above, only the value of $m_1$ has been directly set according to the channel quality whereas the number of UP packets in the remaining subsequences are set according to the equation $m_i = m_{i-1} - 1$, it will be appreciated that it is within the scope of the invention that alternatively, not only $m_1$ but any or even all of the parameters $m_i$ may be set independently.

Setting the parameter k, i.e. the number of packets in each subsequence, will now be described in more detail (step 510). As mentioned above, this parameter is chosen to be constant for all blocks. According to a preferred embodiment of the invention, this constant value is set according to the codec properties.

This is because some media codecs (e.g. voice codecs) can cope with some packet loss. For instance, if the codec is capable of compensating for a packet loss of up to x packets so that the user cannot hear the packet loss, the constant parameter k is set lower than this number x. For this purpose, the compressor may for instance read the payload-type field of the RTP header to detect the used codec, if possible. Alternatively, the compressor uses any available out-of-band signaling.

If the compressor has obtained suitable information on the general properties of the codec, the parameter k is set accordingly. The general properties of codecs might for this purpose be stored in, e.g., a look-up table of the compressor. If the compressor cannot determine suitable information, the parameter k is set to a value which is assumed not to harm the receiving application. In this case, a rather pessimistic approach is preferably used. Moreover, if no information on the codec used is available, the parameters $m_i$ can be slightly increased to nevertheless ensure robustness.

In step 520 of the process depicted in FIG. 5, the numbers $n_i$ of NUP packets in each subsequence is set. As apparent from FIG. 3, once the parameters $m_i$ and k are set, the parameter $n_i$ can be determined according to $n_i = k - m_i$.

Finally, the process of updating the context comprises, with step 530, a procedure of setting the total number p of packets in the sequence. This procedure is depicted in more detail in FIG. 7. As will be discussed hereinafter, the parameter p is, in the preferred embodiment of the invention, set to a value large enough to give the decompressor sufficient time to react with a NACK message to any loss of data packets. The parameter may advantageously be set according to the Round Trip Time RTT, preferably to a small multiple thereof. For this reason, the process of FIG. 7 involves an estimation of the current RTT value.

Figure 7:
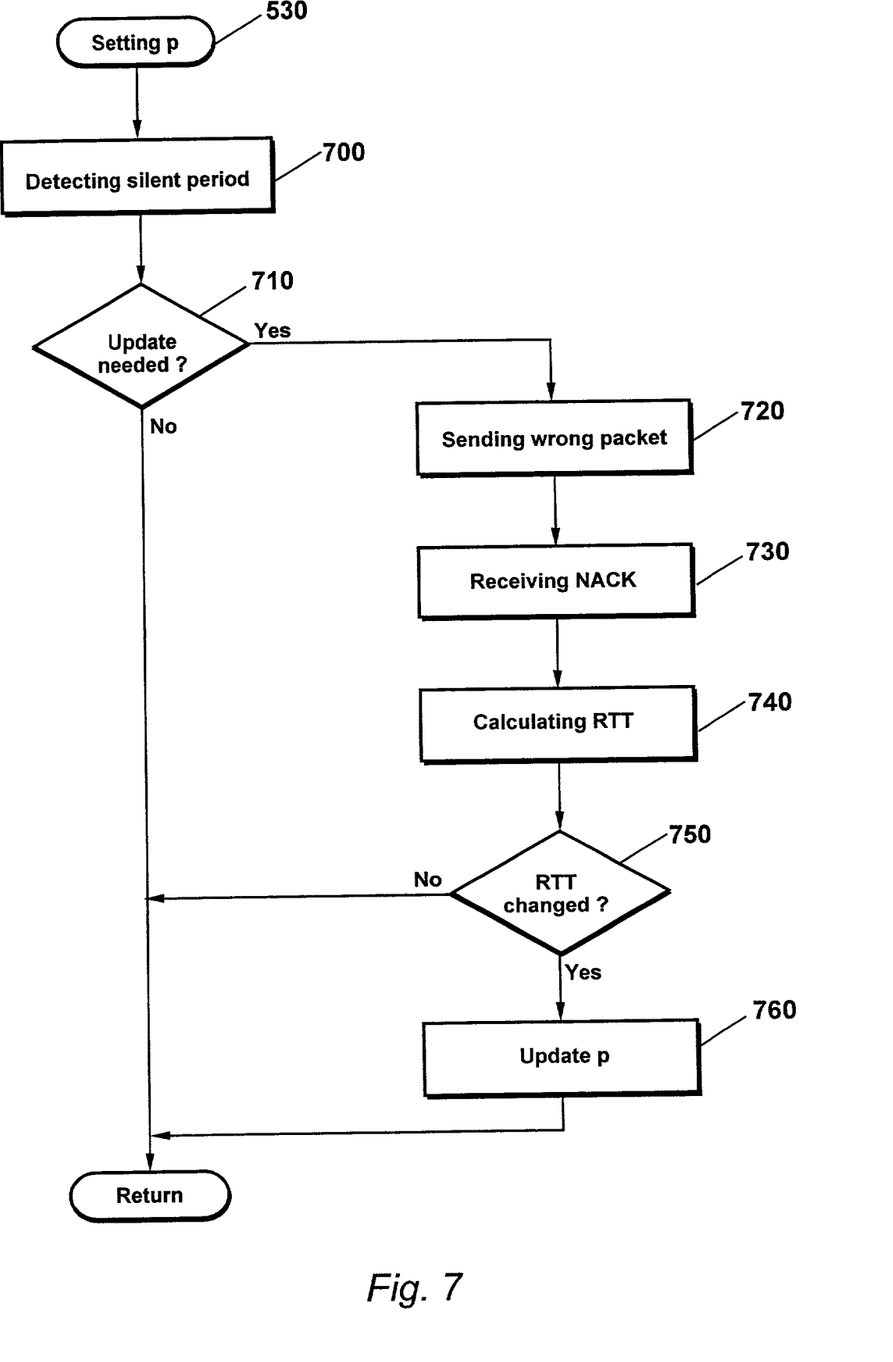
FIG. 7 is a flow chart illustrating the process of setting the total number of packets in the sequence according to a preferred embodiment of the invention.

According to the invention, the process initiates a context loss in a silent period. A silent period is a period of time where no packets are sent. Usually, the compressor detects a silent period, e.g. whenever it cannot receive any RTP packet for a certain time.

First, it is determined in step 700 whether packets are sent. If there is a silent period detected, a wrong packet is sent in step 720. A wrong packet is a packet not having a correctly compressed header so that this packet will invalidate the context 130 of the decompressor 110. The decompressor will then immediately send back a NACK message which is received at the compressor 100 in step 730. The compressor estimates the RTT value in step 740 by calculating the time difference between the time of receiving the NACK and the time of sending the wrong packet. If it is determined in step 750 that the RTT value has changed, the parameter p is updated in step 760. Preferably, the parameter p is chosen to be proportional to the RTT value.

The described process of setting the total number p of packets in the sequence is advantageous because this process is performed when an update procedure after a silent period is started anyway, because of some unpredictable gaps in the timestamp. Thus, there is no additional probability of losing the context 130.

Moreover, the described procedure of estimating the RTT value by sending a wrong packet is advantageous because the process can be performed whenever a silent period is detected. The occurrence of a silent period is independent of any context loss and an adjustment of parameter p may thus be performed frequently even in channels of good quality.

Moreover, the RTT estimation according to the invention is advantageous in that it allows a precise control of the parameter p. If the measurement would for instance be done using NACKs only, without initiating a context loss by sending a wrong packet, the measurement would result in the RTT value plus an additional time where at least one packet is lost and another packet is received. This additional time might be very high and is not computable.

It will be appreciated by those of ordinary skill in the art that according to the invention, the number of consecutive UP packets is set according to the channel quality. Thus, in case of a high quality channel, the number of UP packets can be reduced. When there is a high error rate on the channel, the number of UP packets is increased so that there is still a robust connection between the transmitter and the receiver.

Further, by setting the total number of update and non-update packets transmitted during a context update phase according to the Round Trip Time, adjustment of this number may be performed frequently even with channels of good quality. This allows for a more precise control of finding the best compromise between compression efficiency and transmission robustness.

When the number of NUP packet is determined based on codec properties, the mechanisms according to the invention are made not only adaptive to the current properties of the channel, but also to the type of packet stream. By making the sequence of UP and NUP packets dependent on both the channel quality and the packet stream properties, an even better compromise between compression efficiency and transmission robustness can be achieved.

While the invention has been described with respect to the preferred physical embodiments constructed in accordance therewith, it will be apparent to those skilled in the art that various modifications, variations and improvements of the present invention may be made in the light of the above teachings and within the purview of the appended claims without departing from the spirit and intended scope of the invention. In addition, those areas in which it is believed that those of ordinary skill in the art are familiar, have not been described herein in order to not unnecessarily obscure the invention described herein. Accordingly, it is to be understood that the invention is not to be limited by the specific illustrative embodiments, but only by the scope of the appended claims.

What is claimed is:

1. Method of transmitting data packets over a channel, the data packets having compressed headers, the method comprising:
    compressing a header using a context; and
    transmitting a number of consecutive update packets, each containing data indicating said context;
    determining the channel quality;
    setting the number of update packets based on the determined channel quality;
    transmitting a sequence of subsequences of data packets, each subsequence including a number of consecutive update packets;
    setting the number of consecutive update packets of the first subsequence according to the determined channel quality; and
    subsequently decreasing by a predetermined number the number of update packets in subsequences following the first subsequence.

2. Method of transmitting data packets over a channel from a transmitter to a receiver, the data packets having compressed headers, the method comprising:
    compressing a header using a context; and
    transmitting a sequence of a number of packets comprising a number of update packets, which update said context, and a number of non-update packets, which do not update said context;
    determining a packet round trip time between the transmitter and the receiver; and
    setting the number of update packets and non-update packets in said sequence according to the round trip time.

3. The method according to claim 2, further comprising:
    detecting a silent period, in which no packets are sent by the transmitter;
    transmitting a data packet not having a correctly compressed header;
    receiving a NACK message; and
    setting the round trip time to the time difference between transmitting the data packet not having a correctly compressed header and receiving the NACK message.

4. Method of transmitting data packets over a channel, the data packets having compressed headers, the method comprising:
    compressing a header using a context; and
    transmitting a number of consecutive update packets, each containing data indicating said context;
    determining the channel quality;
    setting the number of update packets based on the determined channel quality; and
    transmitting a number of consecutive non-update packets not containing data indicating said context, said number of non-update packets being determined based on codecs properties and said number of update packets.

5. An apparatus for transmitting data packets over a channel, the data packets having compressed headers, the apparatus comprising:
    a compressor operable to compress a header using a context;
    a transmitter operable to transmit a number of consecutive update packets, each containing data indicating said context;
    a measurement unit operable to determine the channel quality; and
    a controller operable to set said number of update packets based on the determined channel quality; wherein
    said transmitter is operable to transmit a sequence of subsequences of data packets, each subsequence including a number of consecutive update packets; and
    said controller is operable to set the number of consecutive update packets of the first subsequence according to the determined channel quality, and to subsequently decrease by a predetermined number the number of update packets in the subsequence following the first subsequence.

6. An apparatus for transmitting data packets over a channel to a receiver, the data packets having compressed headers, the apparatus comprising:
- a compressor operable to compress a header using a context;
- a transmitter operable to transmit a sequence of a number of packets comprising a number of update packets, which update said context, and a number of non-update packets, which do not update said context;
- a measurement unit operable to determine a packet round trip time between said transmitter and the receiver; and
- a controller operable to set the number of update and non-update packets in said sequence according to the round trip time.

7. The apparatus according to claim 6, wherein said controller is further operable to detect a silent period, transmit a data packet not having a correctly compressed header, receive a NACK message, and set the round trip time to the time difference between the transmitting of the data packet not having a correctly compressed header and the receiving of the NACK message.

8. An apparatus for transmitting data packets over a channel, the data packets having compressed headers, the apparatus comprising:
- a compressor operable to compress a header using a context;
- a transmitter operable to transmit a number of consecutive update packets, each containing data indicating said context;
- a measurement unit operable to determine the channel quality; and
- a controller operable to set said number of update packets based on the determined channel quality;
- wherein said transmitter is operable to transmit a number of consecutive non-update packets not containing data indicating said context, said number of non-update packets being determined based on codec properties and said number of update packets.

* * * * *